3,508,951
PROCESS FOR COATING A SUBSTRATE USING AN EPOXIDE RESIN PRIMER AND AN UNSATURATED POLYESTER TOPCOAT AND PRODUCT OBTAINED THEREBY
David A. Shimp and William S. Bobo, Jr., Louisville, Ky., assignors to Celanese Coatings Company, New York, N.Y., a corporation of Delaware
No Drawing. Filed Sept. 22, 1967, Ser. No. 669,701
Int. Cl. B32b 27/36, 27/38; B44d 1/16
U.S. Cl. 117—72                    10 Claims

ABSTRACT OF THE DISCLOSURE

Room temperature curable compositions useful in moldings, encapsulations, impregnations and coatings made from a blend of (1) an unsaturated polyester, a polymerizable monomer and a free radical producing catalyst with (2) a polyepoxide, an aromatic polyamine and an acid catalyst. Also, a process for coating a substrate with separately applied polyepoxide resin primer and unsaturated polyester topcoat and the resultant product.

BACKGROUND OF THE INVENTION

The field of art to which this invention pertains is to curable mixtures of and to superposed different coatings of epoxide compositions and unsaturated polyester-unsaturated monomer mixtures.

Thermosetting polyester resins and thermosetting epoxide resins are each well known compositions having utility in reinforced and unreinforced plastics as well as in coatings. The polyester resins which are unsaturated polyester-unsaturated monomer mixtures have low viscosities in the uncured state and have good flow, wetting and penetrating properties. When cured, the polyester resins have good chemical (particularly acid) resistance and good weathering properties. However, these resins exhibit high shrinkage upon curing and the cured resins have poor impact resistance and poor adhesion to many substrates, particularly concrete.

Thermosetting epoxide resins in general have higher viscosities than the thermosetting polyester resins with correspondingly poorer flow, wetting and penetrating properties. Epoxide resins cured at room temperature with conventional aliphatic amines have somewhat poor acid resistance. However, epoxide resins exhibit low shrinkage upon cure and the cured compositions have good impact resistance and outstanding adhesion to a variety of substrates.

Various attempts have been made to combine thermosetting epoxide resins and thermosetting polyester resins in order to take advantage of the good properties of each. U.S. Patent 2,809,952 describes encapsulating and coating compositions which are cured at temperatures of at least 100° C. and which are made from an epoxide resin, an adduct of maleic anhydride and hexachlorocyclopentadiene, an unsaturated polyester and a vinyl benzene.

U.S. Patent 2,859,199 describes heat curable compositions made from an epoxide resin, an unsaturated polyester and a vinyl monomer. These materials are said to coreact at temperatures of 75° C. to 300° C. to form cross-linked products.

Cured products made from epoxide resins and polyamines in admixture with polymerized polyester-unsaturated monomer compositions are described in U.S. Patent 2,885,380. Unsaturated polyesters and unsaturated monomers are polymerized to the cured state. They are then pulverized to a powder and are added to the epoxide resin and the amine which are subsequently cured. The polymerized polyester compositions act as fillers and do not dissolve in the epoxide resin-curing agent mixture.

Compatible blends of unsaturated polyesters, unsaturated monomers, epoxide resins and conventional room-temperature curing agents (specifically, aliphatic polyamine and polymercaptan types) do not form well cured compositions under room temperature curing conditions. The curing reaction of each component, polyester-monomer and epoxide resin-curing agent, appears to be inhibited by the presence of the other. Attempts have been made to improve the adhesion of polyester-monomer coatings to concrete by first priming the substrate with an epoxide resin-aliphatic polyamine or polymercaptan followed by applying a polyester-monomer topcoat before the prime coat had gelled. The interface between the two coats remained tacky and poorly cured, resulting in poor adhesive bond strength.

SUMMARY OF THE INVENTION

This invention is concerned with room temperature curable unsaturated polyester-epoxide resin compositions. Particularly, this invention relates to room temperature curable compositions made from unsaturated polyesters and unsaturated monomers in admixture with and in contact with epoxide resins and aromatic amine curing agents. More particularly, this invention pertains to a process for improving the adhesion of unsaturated polyester-unsaturated monomer coatings and to the coated articles obtained thereby by first priming the substrate with an epoxide resin-aromatic amine blend followed by applying, before the prime coat gels, a top coat of an unsaturated polyester-unsaturated monomer solution.

DESCRIPTION OF THE INVENTION

The thermosetting polyester resins useful in this invention are unsaturated polyesters, containing a plurality of polymerizable ethylenic unsaturated groups, dissolved in polymerizable monomers, containing at least one terminal ethylenic unsaturated group, plus a free radical producing catalyst. Such compositions are described in "Polymers and Resins" by B. Golding, D. Van Nostrand Co., Inc., Princeton, N.J. (1959).

Unsaturated polyesters can be prepared by the condensation polymerization of dibasic ethylenic unsaturated acids or anhydrides with glycols. The dibasic acids or anhydrides are reacted with the glycols in substantially equimolar proportions to a low acid value, preferably below about 50. The polyesters contain hydroxyl and acid end groups, ester groups and ethylenic unsaturated groups.

Dibasic acids (which terminology is meant to include the anhydrides) used in preparing the polyesters contain two carboxylic acid groups or one cyclic dicarboxylic acid anhydride group and one polymerizable ethylenic unsaturated group. Examples of such acids include maleic acid, maleic anhydride, fumaric acid, itaconic acid, citraconic acid, citraconic anhydride, mesaconic acid and the like.

Saturated dibasic acids and anhydrides can also be used with the unsaturated dibasic acids to form polyesters having different degrees of flexibility and hardness and varying numbers of cross-linking sites. These saturated acids are phthalic anhydride, adipic acid, azelaic acid, sebacic acid, isophthalic acid, terephthalic acid, tetrabromophthalic anhydride, chlorendic anhydride, tetrachlorophthalic anhydride, tetrahydrophthalic anhydride, etc. Up to as high as 90 mol percent of the acid component of the polyester can be saturated dibasic acid. Preferably, however, the amount of saturated acid component does not exceed 50 mol percent of the total acid.

The glycols used in preparing the polyesters contain two aliphatic hydroxyl groups and no other groups reactive with carboxylic acid groups. Useful glycols include ethylene glycol, propylene glycol, diethylene glycol, dipropylene glycol, polyoxyalkylene glycols, hexylene glycol, neopentyl glycol and the like. Particularly applicable glycols are the dihydroxyalkyl ethers of dihydric phenols which are made by reacting a monoepoxide, an alkylene carbonate, or an alkylene chlorohydrin, such as ethylene oxide, propylene oxide, butylene oxide, butyl glycidyl ether, phenyl glycidyl ether, glycidyl ester of versatic acid, glycidyl acetate, ethylene carbonate, and propylene chlorohydrin with a dihydric phenol, such as resorcinol, hydroquinone, p,p'-dihydroxydiphenyl propane and dihydroxydiphenyl methane. Polyesters made from such glycols are described in U.S. Patent 2,634,251.

Other useful unsaturated polyesters are those prepared by reacting a monoepoxide compound with an unsaturated anhydride using a polyol as an initiator. Polyesters of this type are described in U.S. Patents 2,934,513 and 3,089,863.

Still other useful polyesters are those made by reacting a polymerizable monobasic acid, such as acrylic acid, methacrylic acid or crotonic acid with a polyepoxide compound, such as the diglycidyl ether of p,p'-dihydroxydiphenyl propane. In this reaction, the acid groups of the monocarboxylic acid react with the epoxide groups of the polyepoxide forming hydroxyester groups.

Polymerizable monomers are blended with the unsaturated polyesters in the amount of about 20 to about 70 weight percent based on the total weight of monomer and polyester and preferably 30 to 50 weight percent. The polymerizable monomers contain at least one terminal polymerizable ethylenic unsaturated group and no other groups reactive with the polyester. Examples of useful monomers are styrene, vinyl toluene, methyl methacrylate, ethyl acrylate, butyl acrylate, butyl methacrylate, vinyl acetate, vinyl propionate, chlorostyrene, alpha-methyl styrene, diallyl phthalate, diethylene glycol bis(allyl carbonate), triallyl cyanurate and the like. Preferred monomers are vinyl aromatic compounds particularly styrene and vinyl toluene.

In order to obtain room temperature curable compositions free radical producing catalysts are incorporated in the polyester-monomer solutions in the amount of about 0.1 to about 5 weight percent based on the weight of the polyester and vinyl monomer. Examples of such catalysts are organic peroxides such as acetyl benzoyl peroxide, peracetic acid, methyl ethyl ketone peroxide, cyclohexanone peroxide, cyclohexyl hydroperoxide and cumene hydroperoxide. Included with the free radical producing catalysts are polymerization activators and promoters, such as cobalt naphthenate, cobalt ethylhexoate, diethylaniline, lauryl mercaptan, benzoin and biacetyl.

The thermosetting epoxide resins used in this invention are epoxide compositions, which contain more than one 1,2-epoxide group per molecule in admixture with an aromatic polyamine having at least two amine nitrogen atoms substituted on an aromatic nucleus and more than two amine hydrogen atoms plus an acid catalyst.

The epoxides useful in this invention contain more than one 1,2-epoxide group per molecule and no other groups reactive with amines. They can be saturated or unsaturated, aliphatic, cycloaliphatic, aromatic or heterocyclic and can be monomeric or polymeric in nature.

Useful epoxides include glycidyl ethers of polyhydric phenols obtained by reacting a polyhydric phenol in an excess of epichlorohydrin with sodium hydroxide. Such polyhydric phenols include p,p'-dihydroxydiphenyl propane (or bisphenol A as it is commonly called), resorcinol, hydroquinone, 4,4'-dihydroxydiphenyl ethane, 4,4'-dihydroxybenzophenone, 1,5-dihydroxynaphthalene, 4,4'-dihydroxybiphenyl, and novolak resins containing more than two phenol moieties linked through methylene bridges.

Other glycidyl ethers of polyhydric phenols are polymers prepared by reacting 1.1 up to about 2 mols of epichlorohydrin with 1 mol of dihydric phenol or by reacting diepoxides with added dihydric phenol.

Additional epoxides are glycidyl ethers of polyhydric alcohols made by reacting a polyhydric alcohol and epichlorohydrin with an acidic catalyst such as boron trifluoride and subsequently treating the resulting product with an alkaline dehydrohalogenating agent. Included among the polyhydric alcohols that can be used in the preparation of these epoxides are glycerine, ethylene glycol, propylene glycol, diethylene glycol, hexanetriol, pentaerythritol, trimethylol ethane and trimethylol propane as well as hydroxy containing esters, such as castor oil.

Still other epoxides are glycidyl esters of polycarboxylic acids, such acids being azelaic acid, adipic acid, isophthalic acid, terephthalic acid, dimerized and trimerized unsaturated fatty acids, etc.

Useful epoxides also include epoxidized hydrocarbons, such as vinyl cyclohexene dioxide, butadiene dioxide, dicyclopentadiene dioxide, epoxidized polybutadiene and limonene dioxide. Other epoxides are epoxidized esters, for example, epoxidized soybean oil, epoxidized glycerol trilinoleate, and 3,4-epoxycyclohexylmethyl - 3,4 - epoxycyclohexane carboxylate. Still other epoxides are polymers and copolymers of vinyl polymerizable monoepoxides, such monoepoxides being allyl glycidyl ether, glycidyl acrylate and glycidyl methacrylate.

The preferred epoxides are the glycidyl polyethers of polyhydric phenols and polyhydric alcohols with the most preferred being the glycidyl ethers which have melting points below 40° C. and have epoxide equivalent weights between about 110 and 600.

The aromatic polyamines used in this invention have at least two amine nitrogen atoms substituted on an aromatic nucleus, more than two amine hydrogen atoms and no other groups reactive with epoxy groups. Examples of useful aromatic polyamines are ortho, meta and para-phenylene diamine, methylene dianiline, diaminodiphenyl sulfone, diaminobenzophenone, diaminodiphenyl, diaminodiphenyl amine, diaminodiphenyl ethane, diaminodiphenyl ether, diamino naphthalene and the like. Additional aromatic polyamines are polymeric aromatic polyamines which are the reaction products of aniline and an aldehyde. Mixtures of the reaction products of aniline and formaldehyde which contain about 60 to 80 weight percent methylene dianiline with the remainder being the higher polymeric homologs have been found to be particularly useful. Mixtures of the foregoing described aromatic polyamines and particularly the eutectic mixtures can also be used in this invention.

Aromatic polyamines which are modified by reaction with a monoepoxide compound can also be used in this invention. Suitable monoepoxide modifiers include ethylene oxide, propylene oxide, butylene oxide, butyl glycidyl ether, phenyl glycidyl ether, allyl glycidyl ether, glycidyl acetate, the glycidyl ester of versatic acid, monoepoxides formed by epoxidation of aliphatic olefins having six to twenty carbon atoms, etc. Monoepoxide modifiers are utilized to alter the solubility and reactivity characteristics of the aromatic polyamines whenever such alteration is desired. The amount of modification can be varied quite widely depending upon the particular end use. However, the modified polyamines still retain more than two active amine hydrogens per average molecule in order to obtain sufficient crosslinkability.

The amount of aromatic polyamine which is used in the compositions of this invention is based upon the equivalent weight of the amine and the epoxide. The equivalent weight of the amine is the average molecular weight per each active amine hydrogen atom and the equivalent weight of the epoxide is the average molecular weight per each epoxide group. Generally about 0.75 to about 1.5 amine equivalents are used for each epoxide equivalent with the preferred amounts being 0.9 to 1.1 amine equivalents per epoxide equivalent.

In order to obtain compositions which are curable under room temperature curing conditions, the epoxide resins contain an acid catalyst. The preferred acid catalysts are organic carboxylic acids which contain an aliphatic hydroxyl, a phenolic hydroxyl or a mercapto group on a carbon atom in the 1,2,3 or 4 position from the carboxylic acid group. The more preferred acids are aromatic carboxylic acids which contain a phenolic hydroxyl group in the ortho position and aliphatic carboxylic acids which contain an aliphatic hydroxyl or mercapto group on the carbon atom alpha to the carboxylic acid group. Examples of suitable acid catalysts are salicyclic acid, meta-hydroxy benzoic acid, para-hydroxy benzoic acid, 1-hydroxy-2-naphthoic acid, 3-hydroxy-2-naphthoic acid, lactic acid, glycollic acid, hydroxybutyric acid, hydroxyvaleric acid, beta-hydroxy propionic acid, leucenic acid, mandelic acid, thioglycolic acid, thiohydracrylic acid, thiolactic acid, thiomalic acid, beta-mercapto-propionic acid, thiosalicyclic acid, meta-mercapto benzoic acid, para-mercapto benzoic acid and the like. The amount of acid catalyst used is about 2 to about 25 weight percent based on the weight of the aromatic polyamine and preferably 2 to about 10 weight percent.

In order to improve the solubility and handling properties of the aromatic polyamine as well as the solubility of the acid catalyst in the polyamine, the aromatic polyamine and acid catalyst can be dissolved in an organic non-reactive solvent. Preferred solvents are those having boiling points in excess of 150° C. and which contain amide, ester, ether or ketone groups. The most preferred solvents are the so-called plasticizers which are exemplified by compounds such as dibutyl phthalate, dioctyl phthalate, dimethyl phthalate, diethyl phthalate, dimethoxyethyl phthalate, dibutoxyethyl phthalate, butylbenzyl phthalate, dibutyl sebacate, dioctyl sebacate, and disubstituted amides of six to eighteen carbon atom fatty amides, e.g., N,N-dimethyl oleamide, N,N-dimethyl stearamide, etc., N-bis(2-acetoxyethyl) oleamide, etc. The amount of solvent or plasticizer used with the aromatic polyamine and catalyst can be varied quite widely. However, in order not to impair the chemical and physical resistance properties of the end product, generally no more than about 50 weight percent, based on the weight of polyamine, acid catalyst and solvent, of solvent is used.

In preparing the compositions of this invention, the thermosetting polyester resin, which is a solution of an unsaturated polyester, a polymerizable monomer and a free radical producing catalyst, and the thermosetting epoxide resin, which is a solution of polyepoxide, an aromatic polyamine and an acid catalyst, are blended together in the amount of about 5 to 95 weight percent thermosetting polyester resin based on the total weight of thermosetting polyester resin and thermosetting epoxide resin. The resulting blend will cure at room temperature and useful products can be obtained without the necessity of applying heat. However, if desired, these compositions can be cured by heating up to about 200° C. and their use is not limited to room temperature curing conditions.

The compositions of this invention can also be used to form coatings wherein the thermosetting epoxide resin is used as a prime coat and the thermosetting polyester resin is used as a top coat. Polyesters in such uses as sand-filled toppings, marble-filled terrazzo and glass fiber reinforced overlays on concrete are unsatisfactory due to disbonding from the concrete, generally in less than one year after application. By using a prime coat of a thermosetting epoxide resin (polyepoxide, aromatic polyamine and acid catalyst) followed by the application of a top coat of a thermosetting polyester resin (unsaturated polyester, polymerizable monomer and free radical producing catalyst) before the prime coat has cured, tough, durable room temperature curable coatings are produced which have excellent adhesion to each other and to the substrate being coated.

The compositions of this invention can contain fillers and pigments to modify properties, reduce shrinkage or to improve appearance. Fillers and pigments include sand, marble chips, glass fibers, asbestos, refined clays, calcium carbonate, talc, titanium dioxide, etc. Although these compositions are preferably used at approximately 100% solids, they can also be used with solvents particularly in coating applications.

The following examples are provided to describe the invention in more detail. Parts and percentages where used are by weight.

EXAMPLE 1

A thermosetting polyester resin was prepared by co-dissolving 50 parts of styrene, 1 part of methyl ethyl ketone peroxide at 60% solids in methyl ethyl ketone, 0.75 parts of cobalt naphthenate containing 6% cobalt, and 50 parts of an unsaturated polyester of fumaric acid and the dihydroxypropyl ether of p,p'-dihydroxydiphenyl propane (bisphenol A) made by the procedure as described in U.S. Patent 2,634,251.

A thermosetting epoxide resin was prepared by co-dissolving 65 parts of the diglycidyl ether of bisphenol A having an epoxide equivalent weight of 190 and 35 parts of the glycidyl polyether of castor oil having an epoxide equivalent weight of 600 with 50 parts of an aromatic amine curing agent. The aromatic amine curing agent was a solution of 35.52% dibutyl phthalate, 4% salicylic acid and 60.48% aromatic amine adduct. The aromatic amine adduct was made from 26.65% of the glycidyl ester of versatic acid reacted with 73.35% of an aromatic amine composed of 70% methylene dianiline and 30% higher homologs of formaldehyde and aniline condensates, said aromatic amine having a specific gravity of 1.15 and a melting point of about 80° C.

A compatible blend was made from 70 parts of the thermosetting polyester resin and 30 parts of the thermosetting epoxide resin. The blend gelled in 10 minutes and cured within two days at room temperature to a tough thermoset plastic having a Shore D hardness of 74.

Blends of the same thermosetting polyester resin with a polyepoxide/aliphatic polyamine thermosetting resin and with a polyepoxide/polymercaptan/tertiary amine thermosetting resin gelled to very soft, weak, rubbery compositions having a Shore D hardness of less than 10 after a cure period of two days at room temperature.

EXAMPLE 2

Steel plates were coated with the thermosetting epoxide resin (epoxide plus aromatic polyamine and acid catalyst) described in Example 1. The steel plates were positioned parallel to each other with the coated surfaces toward each other. Before the epoxide resin had gelled, the space between the steel plates was filled with the thermosetting polyester resin described in Example 1, forming a steel/epoxide resin/polyester resin/epoxide resin/steel sandwich. After being left at room temperature for two weeks, the metal plates were pulled apart, exerting a tensile force on the sandwiched composition. A tensile force of 326 p.s.i. was required to part the specimen with failure occurring at the epoxide resin-metal interface and not at the epoxide resin-polyester resin interface.

Similar sandwiches using a polyepoxide/aliphatic polyamine thermosetting resin and a polyepoxide/polymercaptan/tertiary amine thermosetting resin in place of the thermosetting epoxide resin described above failed at the epoxide resin-polyester interface at tensile bond stresses of 58 and 73 p.s.i., respectively.

EXAMPLE 3

A thermosetting epoxide resin was prepared by co-dissolving 100 parts of a diglycidyl ether of bisphenol A having an epoxide equivalent weight of 190 with 45 parts of an aromatic polyamine curing agent. The aromatic polyamine curing agent was a solution of 35.5% dibutyl phthalate, 6% salicylic acid and 58.5% aromatic polyamine composed of about 70% methylene dianiline and 30% higher homologs of formaldehyde and aniline condensates, said aromatic polyamine having a specific gravity of 1.15 and melting point of about 80° C.

The thermosetting epoxide resin was blended with the thermosetting polyester resin described in Example 1. Castings were prepared from the blends and the physical properties were determined after curing at room temperature (25° C.) for two weeks. The composition of the blends and the physical property determinations were as follows:

| Blend | A | B | C | D |
|---|---|---|---|---|
| Thermosetting polyester resin | 30 | 70 | 100 | 0 |
| Thermosetting epoxide resin | 70 | 30 | 0 | 100 |
| Viscosity at 25° C. (cps.) | 1,400 | 500 | 450 | 6,300 |
| Gel time of 100 gram mass (min.) | 110 | 4.3 | 232 | 20 |
| Peak exotherm of 100 gram mass (° F.) | 110 | 290 | 245 | 275 |
| Ultimate tensile strength (p.s.i.) | 3,880 | 6,070 | 6,790 | 8,900 |
| Tensile elongation (percent) | 14.0 | 2.5 | 3.7 | 3.0 |
| Ultimate flexural strength (p.s.i.) | 7,250 | 13,870 | 11,960 | 16,270 |
| Flexural deflection (inches) | >0.60 | 0.30 | 0.34 | 0.20 |
| Ultimate compressive strength (p.s.i.) | 13,020 | 11,640 | 23,230 | 14,990 |
| Compressive yield strength (p.s.i.) | 4,990 | 3,110 | 8,580 | 14,990 |
| Izod impact (ft. lb./in. notch) | 0.71 | 0.52 | 0.24 | 0.43 |
| Hardness (Shore D) | 74 | 80 | 83 | 85 |
| Tensile Shear Strength (steel to steel) (p.s.i.): | | | | |
| After one week at 77° F | 2,880 | 2,090 | 2,620 | 3,040 |
| After one week at 77° F. plus one week at 140° F | 3,510 | 2,290 | 1,910 | 2,560 |

EXAMPLE 4

A thermosetting epoxide resin was prepared by blending 65 parts of a diglycidyl ether of bisphenol A having an epoxide equivalent weight of 190, 35 parts of a glycidyl polyether of castor oil having an epoxide equivalent weight of 600 with 50 parts of an aromatic amine curing agent. The aromatic amine curing agent was made from a solution of 36.63% dibutyl phthalate, 1.0% salicylic acid and 62.37% aromatic amine adduct. The aromatic amine adduct was the reaction product of 26.66% glycidyl ester of versatic acid and 73.34% aromatic amine which was an aniline-formaldehyde condensate containing about 70% methylene dianiline and 30% higher homologs having a specific gravity of 1.15 and a melting point of about 80° C. After allowing an induction period of 10 minutes after blending, the thermosetting epoxide resin was brushed onto the bottom of an aluminum moisture dish to a thickness of 5–10 mils. The thermosetting polyester resin described in Example 1 was immediately poured over the thermosetting epoxide resin primer.

After 48 hours at room temperature, the aluminum cup was peeled off and no residual tack was found at the interface between the primer and topcoat composition. The adhesion of the topcoat to the primer was excellent and could not be separated with a knife blade.

EXAMPLE 5

Using the same procedure as described in Example 4, a prime coat-top coat specimen was prepared using a thermosetting epoxide resin made from 100 parts of the diglycidyl ether of bisphenol A having an epoxide equivalent weight of 190 blended with the aromatic amine curing agent described in Example 4 and using the thermosetting polyester resin described in Example 1. After 48 hours at room temperature, no residual tack was found at the interface of the two resins and the adhesion at the interface was excellent.

It is to be understood that the foregoing detailed description is given merely by way of illustration and that many variations may be made therein without departing from the spirit of the invention.

The embodiments of this invention in which an exclusive property or privilege is claimed are defined as follows:

1. An article comprising a structure having thereon a coating comprising
(A) a room temperature cured thermosetting epoxide resin primer coating in intimate contact with the structure, said thermosetting epoxide resin in the uncured state consisting essentially of
(a) an epoxide composition which contains more than one 1,2 epoxide group per molecule in admixture with
(b) an aromatic polyamine having at least two amine nitrogen atoms substituted on an aromatic nucleus and more than two amine hydrogen atoms, and
(c) an organic carboxylic acid catalyst having an aliphatic hydroxyl group, a phenolic hydroxyl group, or a mercapto group on a carbon atom in the 1, 2, 3 or 4 position from the carboxylic acid group
wherein about 0.75 to about 1.5 amine equivalents of (b) are present for each epoxide equivalent of (a) and wherein the acid catalyst (c) is present in the amount of 2 to 25 weight percent based on the weight of (b), and
(B) a room temperature cured thermosetting polyester resin top coating in intimate contact with said primer coating, said thermosetting polyester resin in the uncured state consisting essentially of
(a) an unsaturated polyester containing a plurality of polymerizable ethylenic unsaturated groups dissolved in
(b) a polymerizable monomer containing at least one terminal ethylenic unsaturated group, and
(c) a free radical producing catalyst wherein the polymerizable monomer (b) is present in the amount of about 20 to about 70 weight percent based on the total weight of (a) and (b) and wherein the free radical producing catalyst (c) is present in the amount of about 0.1 to about 5 weight percent based on the weight of (a) and (b).

2. The article of claim 1 wherein the epoxide composition is a glycidyl polyether of a polyhydric phenol, a glycidyl polyether of a polyhydric alcohol or mixture thereof.

3. The article of claim 1 wherein the acid catalyst is an aromatic carboxylic acid having a phenolic hydroxyl group in the ortho position.

4. The article of claim 1 wherein the acid catalyst is an aliphatic carboxylic acid having an aliphatic hydroxyl group on the carbon atom alpha to the carboxylic acid group.

5. The article of claim 1 wherein the acid catalyst is an aliphatic carboxylic acid having a mercapto group on the carbon atom alpha to the carboxylic acid group.

6. The article of claim 1 wherein the unsaturated polyester is the condensation product of an ethylenic unsaturated dibasic acid and a dihydroxyalkyl ether of a dihydric phenol, and the polymerizable momomer is a vinyl aromatic compound.

7. The article of claim 1 wherein the epoxide composition is the diglycidyl ether of p,p'-dihydroxydiphenyl propane, the aromatic polyamine is methylene dianiline, the acid catalyst is salicylic acid, the unsaturated polyester is the condensation product of fumaric acid and the dihydroxypropyl ether of p,p'-dihydroxydiphenyl propane, and the polymerizable monomer is styrene.

8. The article of claim 7 wherein the structure is a concrete structure.

9. A process for coating an article which comprises
(A) coating the article with a thermosetting epoxide resin primer coating comprised of
(a) an epoxide composition which contains more one 1,2 epoxide group per molecule in admixture with
(b) and aromatic polyamine having at least two amine nitrogen atoms substituted on an aromatic nucleus and more than two amine hydrogen atoms, and
(c) an organic carboxylic acid catalyst having an aliphatic hydroxyl group, a phenolic hydroxyl group, or a mercapto group on the carbon atom in the 1, 2, 3 or 4 position from the carboxylic acid group
wherein about 0.75 to about 1.5 amine equivalents of (b) are present for each epoxide equivalent of (a) and wherein the acid catalyst (c) is present in the amount of 2 to 25 weight percent based on the weight of (b), and before the primer coating has gelled
(B) applying over the primer coating a thermosetting polyester resin top coating comprised of
   (a) an unsaturated polyester containing a plurality of polymerizable ethylenic unsaturated groups dissolved in
   (b) a polymerizable monomer containing at least one terminal ethylenic unsaturated group, and
   (c) a free radical producing catalyst
wherein the polymerizable monomer (b) is present in the amount of about 20 to about 70 weight percent based on the total weight of (a) and (b) and wherein the free radical producing catalyst (c) is present in the amount of about 0.1 to about 5 weight percent based on the weight of (a) and (b), and
(C) curing the primer coating and the top coating at room temperature.

10. The process of claim 9 wherein the epoxide composition is the diglycidyl ether of p,p'-dihydroxydiphenyl propane, the aromatic polyamine is methylene dianiline, and the acid catalyst is salicylic acid.

References Cited

UNITED STATES PATENTS

| | | |
|---|---|---|
| 2,934,452 | 4/1960 | Sternberg. |
| 3,111,420 | 11/1963 | Boenig et al. _____ 117—72 |
| 3,164,488 | 1/1965 | Workman _____ 117—75 |
| 3,376,155 | 4/1968 | O'Donnell _____ 117—72 |
| 3,407,086 | 10/1968 | Voisinet _____ 117—72 |

WILLIAM D. MARTIN, Primary Examiner

R. HUSACK, Assistant Examiner

U.S. Cl. X.R.

117—75, 123; 161—160, 184; 260—835